US008315951B2

(12) United States Patent
Krstulich et al.

(10) Patent No.: US 8,315,951 B2
(45) Date of Patent: Nov. 20, 2012

(54) IDENTITY VERIFICATION FOR SECURE E-COMMERCE TRANSACTIONS (75) Inventors: Zlatko Krstulich, Ottawa (CA); Frederic Gariador, Toulouse (FR)

(73) Assignee: Alcatel Lucent, Paris (FR)

( * ) Notice: Subject to any disclaimer, the term of this patent is extended or adjusted under 35 U.S.C. 154(b) by 736 days.

(21) Appl. No.: 11/979,304

(22) Filed: Nov. 1, 2007

(65) Prior Publication Data
US 2009/0119182 A1 May 7, 2009

(51) Int. Cl.
*G06Q 20/00* (2012.01)
(52) U.S. Cl. ........... 705/65; 726/26; 705/17; 705/41; 705/64; 705/67; 705/14.23; 382/165
(58) Field of Classification Search ............ 705/65
See application file for complete search history.

(56) References Cited

U.S. PATENT DOCUMENTS

| | | | |
|---|---|---|---|
| 4,694,407 A * | 9/1987 | Ogden ............. | 345/441 |
| 6,311,171 B1 * | 10/2001 | Dent ............... | 705/64 |
| 7,266,693 B1 * | 9/2007 | Potter et al. ........ | 713/169 |
| 7,379,921 B1 * | 5/2008 | Kiliccote ........... | 705/75 |
| 7,516,418 B2 * | 4/2009 | Herley et al. ....... | 715/816 |
| 7,630,987 B1 * | 12/2009 | Renfro et al. ....... | 1/1 |
| 7,725,930 B2 * | 5/2010 | Lawrence et al. .... | 726/10 |
| 2002/0082989 A1 * | 6/2002 | Fife et al. .......... | 705/39 |
| 2003/0120555 A1 * | 6/2003 | Kitagawa ........... | 705/26 |
| 2003/0182246 A1 * | 9/2003 | Johnson et al. ..... | 705/76 |
| 2005/0021786 A1 * | 1/2005 | Kikkawa et al. .... | 709/229 |
| 2006/0008124 A1 * | 1/2006 | Ewe et al. .......... | 382/117 |
| 2006/0015722 A1 * | 1/2006 | Rowan et al. ....... | 713/166 |
| 2006/0026421 A1 * | 2/2006 | Gasparini et al. .... | 713/156 |
| 2006/0129804 A1 * | 6/2006 | Satkunanathan et al. | 713/156 |
| 2006/0200487 A1 * | 9/2006 | Adelman et al. ..... | 707/102 |
| 2006/0200855 A1 * | 9/2006 | Willis ............... | 726/2 |
| 2006/0253446 A1 * | 11/2006 | Leong et al. ........ | 707/9 |
| 2007/0050840 A1 * | 3/2007 | Grandcolas et al. .. | 726/5 |
| 2007/0055749 A1 * | 3/2007 | Chien .............. | 709/219 |
| 2007/0074119 A1 * | 3/2007 | Komine et al. ...... | 715/743 |

(Continued)

OTHER PUBLICATIONS

Bourke, P. "An Introduction to Fractals." Sep. 12, 2006. All pages. Retrieved via Wayback Machine on Feb. 24, 2010. http://local.wasp.uwa.edu.au/~pbourke/fractals/fracintro/.*

(Continued)

*Primary Examiner* — James A Reagan
*Assistant Examiner* — Calvin Cheung
(74) *Attorney, Agent, or Firm* — Kramer & Amado P.C.

(57) ABSTRACT

A method and apparatus are provided for providing authentication of an e-commerce server to a user engaging in e-commerce transactions. When the user begins an e-commerce session, the e-commerce server requests an authentication token from an authentication proxy with which it has registered. If the authentication proxy recognizes the e-commerce server, the authentication proxy generates an authentication token in the form of a simple image, and sends the authentication token to the e-commerce server over a trusted path. The e-commerce server sends the authentication token to the user. The authentication proxy also sends a copy of the authentication token to the user over a second trusted path to a second device or application accessible by the user. The user can then see that the authentication token presented by the e-commerce server matches the authentication token presented by the authentication proxy. Since the user has received the two authentication proxies over separate channels, one of which is typically secure, the user can be assured that the e-commerce server has been authenticated by the authentication proxy, and that the e-commerce server is therefore legitimate.

32 Claims, 4 Drawing Sheets

U.S. PATENT DOCUMENTS

| | | | | |
|---|---|---|---|---|
| 2007/0094500 | A1* | 4/2007 | Shannon et al. | 713/170 |
| 2007/0107050 | A1* | 5/2007 | Selvarajan | 726/5 |
| 2007/0162961 | A1* | 7/2007 | Tarrance et al. | 726/5 |
| 2007/0198436 | A1* | 8/2007 | Weiss | 705/75 |
| 2007/0208940 | A1* | 9/2007 | Adelman et al. | 713/168 |
| 2007/0214151 | A1* | 9/2007 | Thomas et al. | 707/10 |
| 2007/0245148 | A1* | 10/2007 | Buer | 713/182 |
| 2007/0245343 | A1* | 10/2007 | Shannon et al. | 717/174 |
| 2007/0282832 | A1* | 12/2007 | Herley et al. | 707/6 |
| 2008/0082821 | A1* | 4/2008 | Pritikin | 713/169 |
| 2008/0109657 | A1* | 5/2008 | Bajaj et al. | 713/168 |
| 2008/0141313 | A1* | 6/2008 | Kato et al. | 725/62 |
| 2008/0172741 | A1* | 7/2008 | Reumann et al. | 726/23 |
| 2008/0201464 | A1* | 8/2008 | Campbell et al. | 709/224 |
| 2008/0244715 | A1* | 10/2008 | Pedone | 726/5 |
| 2008/0244744 | A1* | 10/2008 | Thomas et al. | 726/23 |
| 2009/0037997 | A1* | 2/2009 | Agbabian et al. | 726/10 |
| 2009/0046708 | A1* | 2/2009 | Koziol | 370/360 |
| 2009/0064321 | A1* | 3/2009 | Dick et al. | 726/21 |
| 2009/0067627 | A1* | 3/2009 | Hogl | 380/243 |
| 2009/0077383 | A1* | 3/2009 | de Monseignat et al. | 713/175 |
| 2009/0089287 | A1* | 4/2009 | Roberts et al. | 707/6 |
| 2009/0138950 | A1* | 5/2009 | Hird | 726/7 |
| 2009/0144308 | A1* | 6/2009 | Huie et al. | 707/102 |
| 2009/0157675 | A1* | 6/2009 | Stellhorn et al. | 707/6 |
| 2009/0164472 | A1* | 6/2009 | Huang et al. | 707/10 |
| 2009/0165108 | A1* | 6/2009 | Chen et al. | 726/7 |
| 2009/0199272 | A1* | 8/2009 | Gopalakrishna | 726/3 |
| 2009/0249445 | A1* | 10/2009 | Deshpande et al. | 726/3 |
| 2009/0292925 | A1* | 11/2009 | Meisel | 713/176 |
| 2010/0042931 | A1* | 2/2010 | Dixon et al. | 715/738 |
| 2010/0049975 | A1* | 2/2010 | Parno et al. | 713/168 |
| 2010/0058438 | A1* | 3/2010 | Rajaram | 726/2 |
| 2010/0083383 | A1* | 4/2010 | Adler et al. | 726/26 |
| 2010/0088507 | A1* | 4/2010 | Cho | 713/156 |
| 2010/0095371 | A1* | 4/2010 | Rubin | 726/18 |
| 2010/0161468 | A1* | 6/2010 | Hickman | 705/35 |
| 2010/0186088 | A1* | 7/2010 | Banerjee et al. | 726/23 |

OTHER PUBLICATIONS

Dictionary.com. "Gait Recognition." Oct. 14, 2007. All pages. Retrieved via Wayback Machine on Feb. 24, 2010. http://dictionary.reference.com/browse/gait+recognition.*

Chen, W.S. and Yuun, S.Y. "A Novel Personal Biometric Authentication Technique Using Human Iris Based on Fractal Dimension Features." Acoustics, Speech, and Signal Processing, 2003. Proceedings. (ICASSP '03). 2003 IEEE International Conference on Volume: 3, pp. III-201-4 vol. 3. All pages are pertinent.*

Yang, S. and Verbauwhede, I.M. "A Secure Fingerprint Matching Technique." Nov. 8, 2003. All pages.*

Yu-diong, X. and Zhi-xiong, W. "Fractal Dimension of Voice-Signal Waveforms." 2002. Wuhan University Journal of Natural Sciences vol. 7 No. 4. All pages.*

Tally et. al. "Anti-Phishing: Best Practices for Institutions and Consumers" All pages. McAfee. Sep. 2004. Retrieved on Sep. 22, 2010. <http://www.antiphishing.org/sponsors_technical_papers/Anti-Phishing_Best_Practices_for_Institutions_Consumer0904.pdf>.*

* cited by examiner

IDENTITY VERIFICATION FOR SECURE E-COMMERCE TRANSACTIONS

FIELD OF THE INVENTION

The invention relates to e-commerce transaction security, and in particular providing end-users with confirmation of the source of information.

BACKGROUND OF THE INVENTION

People are becoming increasingly reliant on the Internet for consumer business transactions such as shopping, banking, and paying bills. These activities, referred to collectively as e-commerce, require that users have a mechanism to assure themselves that the system at the other end of the communication is legitimately the business it purports to be, and is not falsely representing itself. In other words, users need some way to verify the identity of a system at the far end of the e-commerce transaction.

This is particularly important with the rise of "phishing". Members of the general public can be fooled into providing personal information by simply displaying a banner at the top of a computer interface window. An illegitimate entity presents the user with a web page purporting to belong to a legitimate business, and collects any sensitive information entered by the user. Examples of people being tricked into entering sensitive information, such as passwords or social security numbers, into false websites are unfortunately very common. Nefarious activities such as phishing can erode the public's confidence in e-commerce.

There is therefore a need for the general public to easily and reliably verify the identity of a requester of sensitive information during an online session. Such a verification mechanism must be user friendly and not require any specialized knowledge, so that users may engage in e-commerce with ease and confidence.

SUMMARY OF THE INVENTION

In accordance with one aspect of the invention, a method is provided for verifying the identity of an e-commerce server to a user upon the user engaging in an e-commerce transaction with the e-commerce server through a first device using a first application. An authentication token in the form of an image is generated at an authentication proxy. The authentication token is sent to the e-commerce server over a first trusted path, and the e-commerce server then sends the authentication token to the first application on the first device. A representation of the authentication token is also sent from the authentication proxy to a second application accessible by the user over a second trusted path. The second application may be on a second device, the identity of which may be determined based on which devices other than the first device is currently being used by the user.

In accordance with another aspect of the invention, a method by which an e-commerce server verifies its identity to a user upon the user engaging in an e-commerce transaction with the e-commerce server through a first device. An identity of the user is sent to an authentication proxy. An authentication token is received from the authentication proxy, and then displayed on the first device in a way which does not interfere with the e-commerce transaction.

In accordance with yet another aspect of the invention, a method by which an authentication proxy facilitates verification of an e-commerce server to a user upon the user engaging in an e-commerce transaction with the e-commerce server through a first device. An identity of the user is received from the e-commerce server. An authentication is generated, and sent to the e-commerce server. A representation of the authentication server is sent to a second device, accessible by the user and identifiable from the identity of the user, over a trusted path.

In accordance with yet another aspect of the invention, a method by which a server within a telecommunication service provider network facilitates verification of an e-commerce server to a user upon the user engaging in an e-commerce transaction with the e-commerce server using a first device. A representation of an authentication token and an identity of the user are received from an authentication proxy. The identity of a second device, accessible by the user, is determined using the identity of the user. The representation of the authentication token is sent to the second device.

Apparatus for carrying out the methods of the invention are provided. The methods of the invention may be stored on computer-readable medium in the form of instructions for executing the logic of the methods.

The methods and apparatus of the present invention allow a user to verify the identity of an e-commerce provider with ease. Secure communication between an e-commerce provider and an authentication proxy allow simultaneous or near-simultaneous transmission of a graphical token to the user over two distinct communication channels. From the user's perspective, the user is presented with tokens in both the device through which he or she is engaging in the e-commerce transaction and in a second nearby electronic device. Since the tokens are being transmitted to the separate devices over separate channels from separate entities that have established a trusted association, one of which entities (typically the telecommunications service provider) is also trusted by the user and has the unique ability to communicate with the user over a physically secure channel and display, the user can be confident that matching tokens signify that the e-commerce provider is legitimate. The invention is particularly useful as access providers provide bundled communications and entertainment services which their customers access using a widening plethora of communications and entertainment devices both inside the home and on the move, allowing for example a user to make an on-line purchase using his or her computer and seeing verification of the seller's identity on his or her graphic-enabled cell phone. The authentication proxy may be operated by an entity that provides credit card verification or acts as a Certification Authority, in which case the authentication proxy will already have appropriate tools and relationships for establishing trusted paths with various e-commerce service providers and telecommunication service providers, and such entities may therefore extend the range of services offered to e-commerce service providers and telecommunication service providers.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
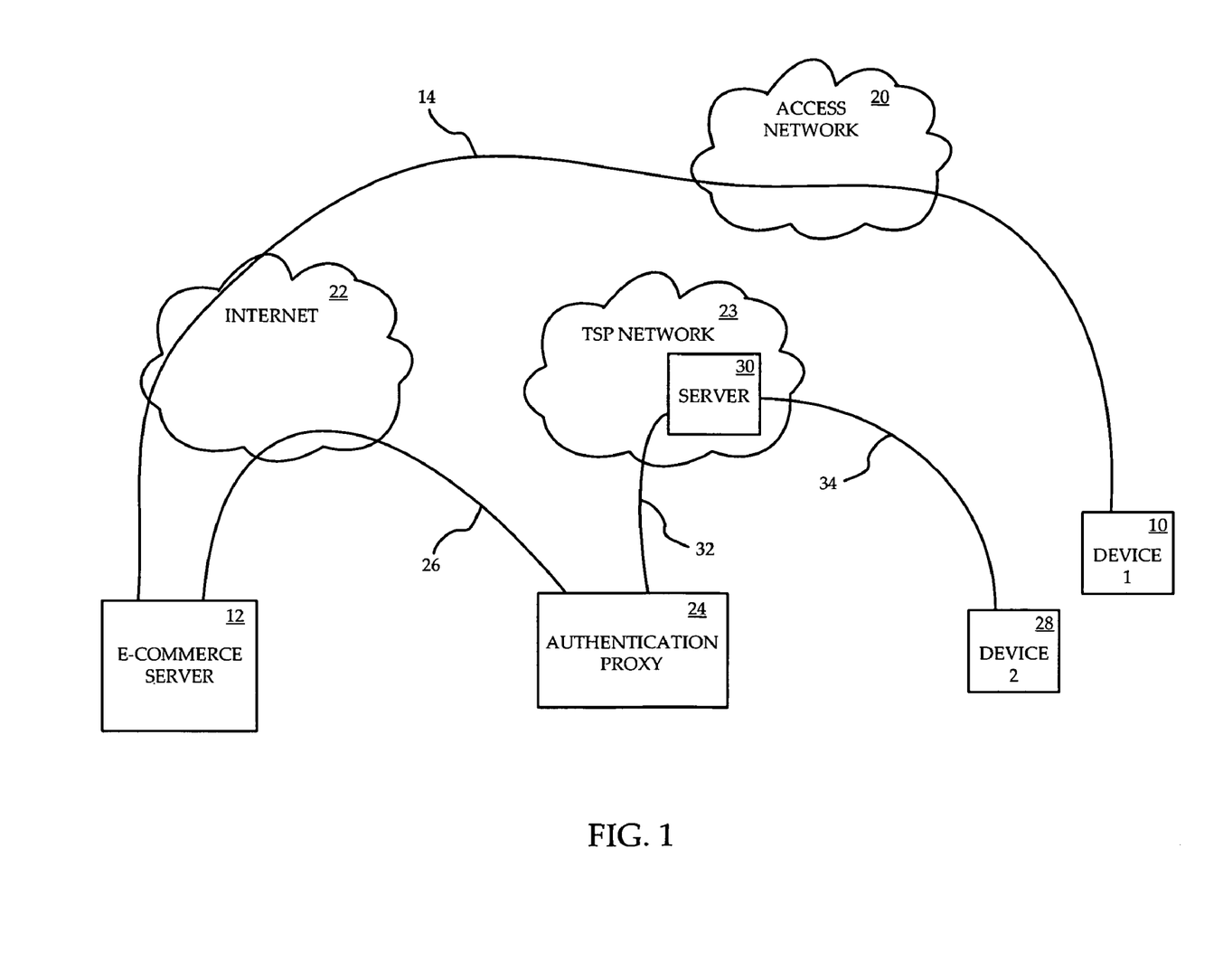
FIG. 1 is a diagram of a network in which identity verification during e-commerce transactions is provided according to one embodiment of the invention.

Referring to FIG. 1, a network in which identity verification during e-commerce transactions is provided according to one embodiment of the invention. A first device 10 communicates with an e-commerce server 12 over a first connection 14. The first device 10 is one through which an end-user can engage in e-commerce transactions using a first application, such as a web browser on a personal computer. The first connection 14 passes through an access network 20 operated by an Internet Service Access Provider, possibly through a home network and residential gateway (not shown) if the first device 10 requires these for accessing the access network 20, and through the Internet 22 to the e-commerce server 12.

An authentication proxy 24 communicates with the e-commerce server along a first trusted path 26, which is preferably encrypted. The first trusted path 26 is established by an authentication service which ensures that the e-commerce server 12 and the authentication proxy 24 are each confident of the identity of the other. In order to create the first trusted path 26, the operator of the e-commerce server 12 registers with the authentication proxy 24. The operator of the authentication proxy 24 only allows such registration for legitimate e-commerce operators, such as banks, retailers, or other reputable on-line businesses such as Ebay and Paypal. Since both the e-commerce server 12 and the authentication proxy 24 are both operated by businesses rather than by home users, the first trusted path 26 can be established using secure business-to-business services. The authentication proxy is typically under a different administrative control than that of the access network 20.

The authentication proxy 24 can also communicate with a server 30 within the operational domain of a Telecommunication Service Provider (TSP) network 23 over a first secure path 32, and the server 30 in turn can communicate with a second device 28 accessible by the user of the first device 10. The server 30 communicates with the second device 28 over a second secure path 34. Since the primary function of the server 30 is to forward information from the authentication proxy 24 to the second device 28, the first secure path 32 and the second secure path 34 can be considered collectively as a second trusted path by which the authentication proxy 24 sends information to the second device 28.

In operation, the user accesses the e-commerce server 12 through the access network 20 using the first device 10 in order to engage in an e-commerce transaction. One example of such a transaction is the on-line purchase of an item, in which case the e-commerce server is under the administrative control of the vendor or an agent of the vendor. Another example is on-line banking, in which case the e-commerce server is typically under the administrative control of a bank. The first device 10 is any home or office electronic device which allows a user to engage in e-commerce, such as a personal computer equipped with a web browser.

Upon receipt of a request for an e-commerce transaction from the first device 10, the e-commerce server 12 informs the authentication proxy 24 of the identity of the user of the first device 10, which may in the form of other information from which the authentication proxy 24 can determine the identity of the user of the first device 10. The authentication proxy 24 sends an authentication token to the e-commerce server 12 over a trusted path. The e-commerce server sends the authentication token to the first device 10, where it is displayed in the first application in a manner which does not substantially interfere with the e-commerce transaction.

When the authentication proxy 24 sends the authentication token to the e-commerce server 12, it also sends a representation of the authentication token to the second application on the second device 28 via the server 30. The second device 28 is an electronic device capable of graphical display, such a cell phone equipped with graphical display, a personal digital assistant, a digital set-top box which uses a television screen for display, or a personal computer. The second application is the normal interface of the second device 28, such as the display on a cell phone or on a television screen. The representation of the authentication token is displayed on the second application on the second device 28, whereupon the user can visually compare the authentication token displayed on the first device 10 with the authentication token displayed on the second device 28. If the tokens on each device match, the user may be confident that the entity with which he or she is engaging in e-commerce is legitimate.

If the entity with which the user is attempting to engage in e-commerce through the first device 10 is unable to take advantage of this authentication technique (for example, if it is not legitimate and is attempting to "phish" a valid site that normally uses this authentication technique), then no first trusted path 26 will exist between the e-commerce server 12 and the authentication proxy 24. Even if the false e-commerce server 12 sends a token to the first device 10, the authentication proxy 24 will not be sending an identical token to the second device 28 via the access network 20. Since the user does not see matching tokens on the first device 10 and the second device 28, the user will be aware that that particular transaction is not proceeding in the highest trust context, encouraging caution. If that particular site has habitually used a dual channel security token as described herein in the past and for some reason is no longer doing so, suspicion of fraudulent activity is clearly raised with the user.

Figure 2:
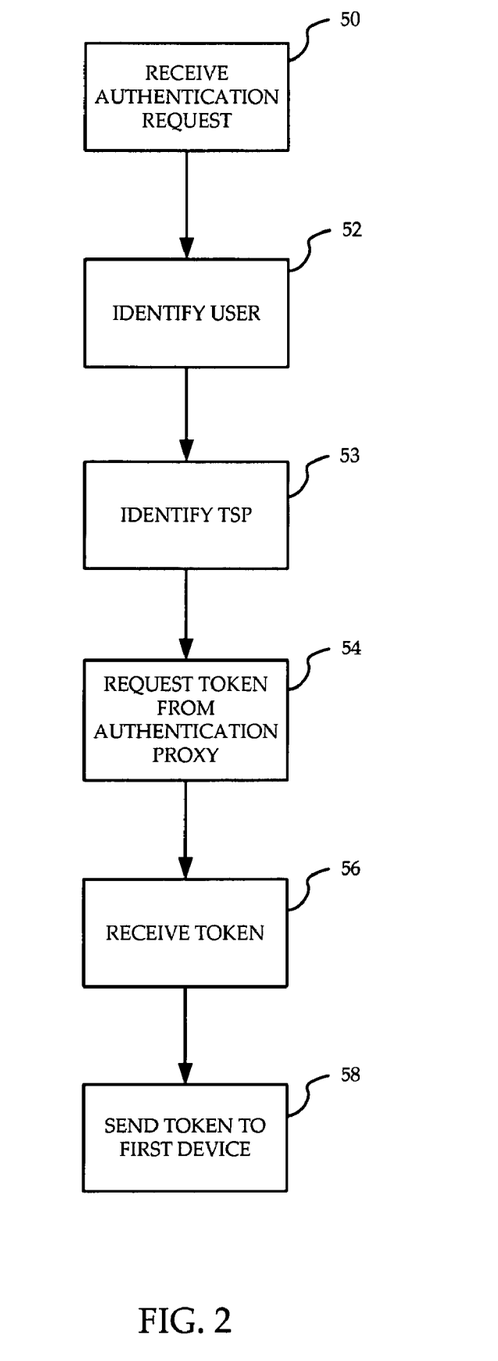
FIG. 2 is a flowchart of a method carried out by the e-commerce server of FIG. 1 according to one embodiment of the invention.

Referring to FIG. 2, a flowchart of a method carried out by the e-commerce server 12 according to one embodiment of the invention is shown. At step 50 the e-commerce server receives a request for authentication from a first device 10. The request for authentication may either be made explicitly by the user, or may be implicit in that authentication is requested the first time a secure web page hosted on the e-commerce server 12 is accessed by the first device 10. At step 52 the e-commerce server 12 identifies the user. This is accomplished through the exchange of the user's account information (username and password upon logon), or personal information solicited from a first-time user wishing to engage in a secure transaction. At step 53 the e-commerce server 12 collects information to identify the TSP (Telecommunications Service Provider) 23 most likely associated with the user. This may be done by a number of mechanisms, such as: (a) direct inquiry of the user during the transaction or at initial registration; (b) inspection of the domain part of the user's e-mail address; or (c) comparison of the source Internet Protocol (IP) address assigned by the access network 20 to the first device 10 with public databases on IP address block allocation, if the user confirms that he or she is accessing the Internet 22 through the user's TSP 23. At step 54 the e-commerce server requests an authentication token from the authentication proxy 24 over the first trusted path 26. The request for an authentication token also includes the identity of the user and direct or indirect information on the identity of the user's TSP 23.

At step 56 the e-commerce server 12 receives the authentication token from the authentication server over the first trusted path 26. At step 58 the e-commerce server 12 transmits the authentication token to the first device 10 such that the authentication token is displayed on the first device 10. One example of how the e-commerce server transmits the authentication token to the first device 10 is to embed the authentication token in an unobtrusive corner of a web page displayed on the first device 10. As another example, the e-commerce server may display the token as a low contrast watermark (i.e. an image visible on the screen background, but not completely obscuring the background) in web pages displayed on the first device 10.

Figure 3:
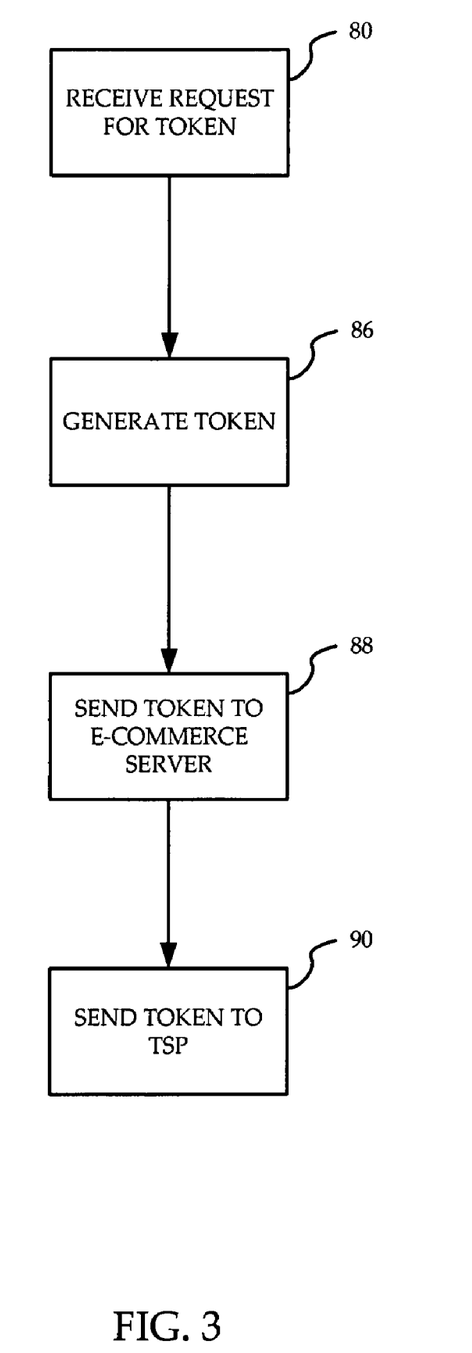
FIG. 3 is a flowchart of a method carried out by the authentication proxy of FIG. 1 according to one embodiment of the invention.

Referring to FIG. 3, a flowchart of a method carried out by the authentication proxy 24 according to one embodiment of the invention is shown. At step 80 the authentication proxy 24 receives from the e-commerce server 12 a request for an authentication token. The request for the authentication token also includes the identity of a user and information about a TSP, as described above with reference to step 54 of FIG. 2.

At step 86 the authentication proxy 24 generates an authentication token. This generation may be made by selecting an authentication token from a storage of authentication tokens, or by generating parameters for an authentication token, or a combination of both. An example of a combination would be to select a particular shape from a storage of shapes, and then assign a randomly generated colour to the shape. In either case (selection from a storage or generation of parameters) there is a high degree of randomness in the generation of the authentication token, so that the user will be unlikely to receive the same authentication token for two successive e-commerce transactions. The authentication token is preferably in the form of a small easily recognizable digital image, such as a bitmap or vector image of a green circle, a blue square, or a red maple leaf. The authentication token is ideally of a simple enough shape and colour that a user seeing two copies of the authentication token can quickly determine by visual inspection that the two copies match.

At step 88 the authentication proxy 24 sends the authentication token to the e-commerce server 12 over the first trusted path 26. At step 90 the authentication proxy 24 sends a copy of the authentication token to the server 30 within the TSP 23, along with the identity of the user received from the e-commerce server 12 at step 80. The authentication proxy 24 determines to which TSP 23 the copy of the authentication token is to be sent using the information about the TSP which was received from the e-commerce server at step 80. Alternatively the authentication proxy 24 may send the authentication token to the server 30 before sending it to the e-commerce server 12.

Figure 4:
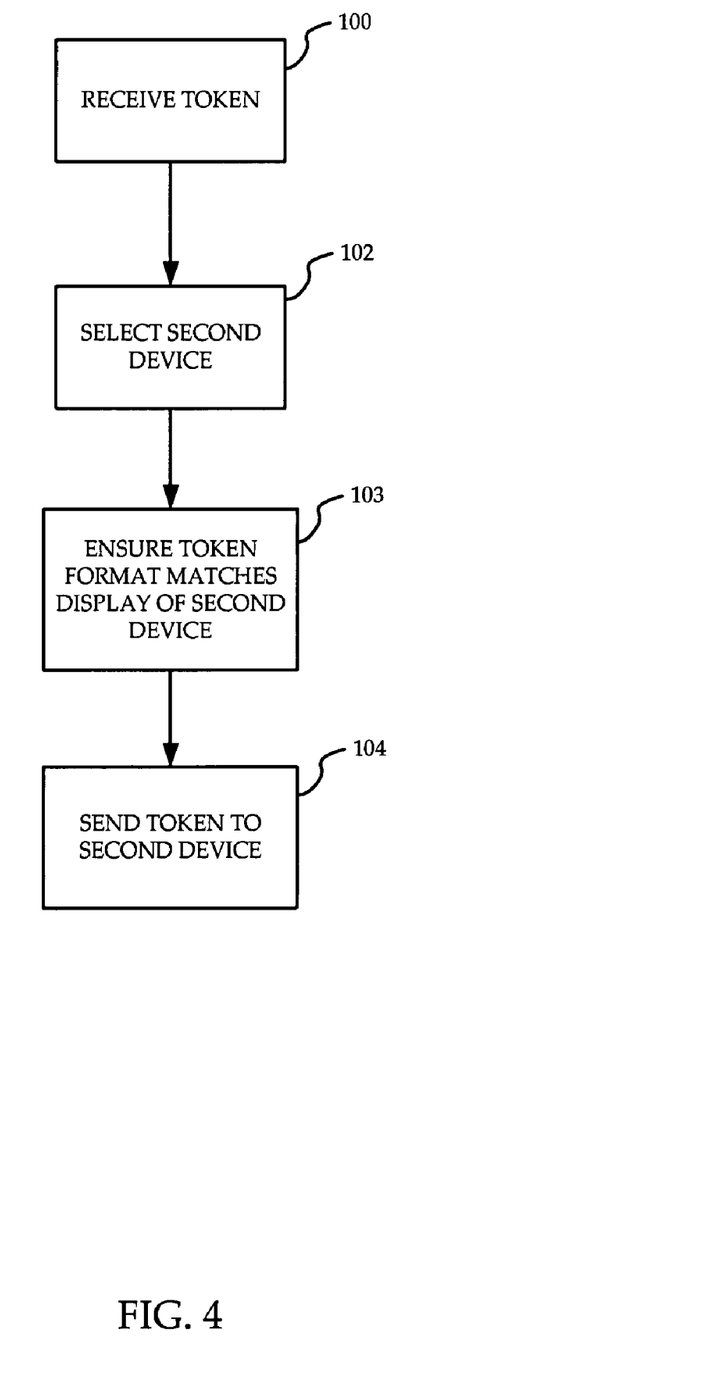
FIG. 4 is a flowchart of a method carried out by a server within the access network of FIG. 1 according to one embodiment of the invention.

Referring to FIG. 4, a flowchart of a method carried out by the server 30 within the TSP 23 according to one embodiment of the invention is shown. At step 100 the server 30 receives from the authentication proxy 24 an authentication token along with an identity of the user of the first device 10. At step 102 the server 30 determines the identity of the second device 28 by determining which devices or applications on devices assigned to the user, identified by the identity received at step 100, are currently active and are currently in use by the user, and which of those devices or applications would be most appropriate for displaying the verification token received from the authentication proxy 24. In cases where the primary device is also within the TSP 23, the server 30 can ensure that the second device is different from the first device. If the exact identity of the first device is not ascertained, the server 30 assumes that the first device is a computer and selects a different second device on which to display the token. The server 30 may also take into account the user's recent activity on various devices and applications registered with the TSP 23, thereby using the user's "presence" in order to determine the most appropriate device or application for use as the second device 28. For example, the operator of an access network which provides bundled services to the user knows whether the user's cell phone is on, whether the user has logged on to an IPTV session, and whether the user is logged on to the internet using a second computer. Whether a particular device is currently in active use may also be determined and used as a factor in determining the user's presence. For example, it may be determined whether the user's cell phone is taking or receiving messages, whether the user is actively selecting channels during an IPTV session, or whether the user is actively using the keyboard of a second computer. Based on the user's presence, the server selects as the second device 28 a device which the user appears to be currently using. At step 103 the server 30 reformats the authentication token to suit the display capabilities of the second device 28, if necessary. At step 104 the server 30 sends the authentication token, received at step 100, to the second device 28 for display.

The invention has been described as the authentication proxy 24 being under a different administrative control from that of the TSP 23. This allows providing of the authentication services completely separate from operation of the access network, which allows the authentication services to be provided by a different party. Alternatively, the authentication proxy 24 may be under the same administrative control as that of the TSP 23. However, while this may simplify signaling between the authentication proxy and the second device, such an embodiment limits the different business arrangements allowed by separation of administrative responsibility.

Similarly, the authentication proxy 24 may be under the same administrative control as that of the e-commerce server 12. In such an embodiment, the end user relies on a trusted relationship between the TSP 23 and the e-commerce server 12. The end user is still provided with an authentication tokens on two separate devices. Since the end user knows that the TSP 23 would only display an authentication token on the second device which it received from a trusted e-commerce server, the user is reassured that the e-commerce transaction is legitimate.

The invention has been described as selecting the second device 28 based on the user's presence as determined by the TSP which provides bundled services to the user. Alternatively, the user may select a device to be used as the second device 28, either at the time of engaging in the e-commerce transaction or ahead of time by setting a preference with the access network. The server within the TSP may also set a default device as the second device 28, for cases in which the user has selected no device or in which the user's presence cannot be used to select a device, either because the user's presence cannot be determined or the user appears to be using no other devices. In such an embodiment, the server within the TSP stores the identity of the second device 28, and simply selects the stored identity at step 102 of FIG. 4.

The invention has been described using a simple geometric shape as the authentication token displayed to the user through the first device 10 and the second device 28. Alternatively, a fractal pattern can be used as an authentication pattern. In such an embodiment, a bitmap need not be transmitted but rather simply the seed values of a fractal drawing routine.

The invention has been described as sending a graphical representation of the authentication token to the second device 28. Alternatively an audio or text description of the authentication token may be sent to the second device 28, such as "green circle". The user may then verify the graphical representation of the authentication token which is displayed in the first device 10 with the audio or text description received through the second device 28. This allows verification of the identity of the e-commerce provider through devices which are not enabled with graphics. However in such an embodiment comparison of the two pieces of information will not be as quick or intuitive as comparing two graphical representations.

The invention has been described as transmitting an authentication token to two separate devices. Alternatively the two copies of the authentication token may be displayed, either graphically or through text or audio, on two different applications on the same device. One copy of the authentication token is sent to a first application on the first device, the first application being one through which the user is engaging in the e-commerce transaction, and a second copy of the authentication token is set to a second application accessible by the user on the first device. As long as the two different separate applications each receive a representation of the authentication token over separate secure channels, one from the e-commerce server and one from the authentication proxy over a secure channel, then the user can be confident that the e-commerce server is an authenticated and trusted server. In such an embodiment, the identity of the first application is exchanged between the e-commerce server, authentication proxy, and TSP, rather than the identity of a first device. Similarly, the server within the access network determines an identity of the second application, rather than the identity of a second device.

The invention has been described as sending a single authentication token to each of two devices, or to each of two applications on a single device. In an alternative embodiment, the authentication can be refreshed intermittently by generating or selecting additional authentication tokens intermittently for transmission to the user. Each additional authentication token is generally different from the others sent to a particular user, although if the tokens are generated or selected randomly there may be some repetition depending on the length of the e-commerce session and the pool from which the tokens are generated or selected. This reassures the user that the authentication is an on-going process. In such an embodiment, the steps 56 and 58 of FIG. 2, the steps 86, 88, and 90 of FIG. 3, and the steps 100 and 104 of FIG. 4 are repeated periodically, at least until user is no longer requesting information or services from the e-commerce server 12. As an alternative to generating and transmitting authentication tokens periodically, authentication tokens can be generated and transmitted whenever the user interacts with the e-commerce server 12 such as by completing forms or requesting new web pages.

The invention has been described with the authentication proxy 24 sending a copy or representation of the token to a server within the TSP, which in turn determines a second device or application and sends the token to the second device or application. Alternatively, the authentication proxy can determine the identity of the second device or application itself, and communicate directly with the second device or application. This allows the access network to act simply as a dumb pipe for information transfer, and removes any specialized logic from the TSP. However, such an embodiment requires that the authentication proxy be able to select a second application or device given the identity of the user, which may require access to a database of identities of the user's various devices.

The invention as described with reference to FIG. 1 has the TSP 23 separate from the access network 20. This may occur for example if the user is accessing the Internet 22 from a device through a wireless connection away from home. However, as alluded to above, the access network 20 may be within the TSP network 23, such as would typically be the case if the user were accessing an e-commerce server through his or her home Internet access. In such a case, the determination of the TSP 23 by the e-commerce server 12 (as described above with respect to step 53 of FIG. 2) could be accomplished by comparing the source IP address of the user's traffic from the first device 10 with ranges of addresses assigned to each TSP, which is a matter of public record.

The invention is implemented as hardware on the devices within FIG. 1.

The embodiments presented are exemplary only and persons skilled in the art would appreciate that variations to the embodiments described above may be made without departing from the spirit of the invention.

We claim:

1. An apparatus comprising:
a first device that allows a user to engage in e-commerce transactions;
an e-commerce server, coupled to the first device by an access network,
  wherein an identity of the e-commerce server has not been verified;
an authentication proxy, coupled to the e-commerce server by a first trusted path,
  wherein the authentication proxy generates an authentication token, wherein the authentication token is a fractal pattern, and
  wherein the authentication proxy sends the authentication token to the e-commerce server over the first trusted path which further comprises seed values to create the fractal pattern;
a Telecommunication Service Provider (TSP) server, coupled to the authentication proxy by a first secure path; and
a second device, coupled to the TSP server by a second secure path, wherein the first secure path and the second secure path act as a second trusted path,
  the user verifies the identity of the e-commerce server by comparing the first device to the second device, and
  the user determines that the e-commerce server is legitimate after matching the first device to the second device.

2. A method of verifying the identity of an e-commerce server comprising:
generating an authentication token with an authentication proxy, wherein the authentication token is a fractal pattern;
sending the authentication token from the authentication proxy to the e-commerce server over a first trusted path, wherein sending the authentication token from the authentication proxy to the e-commerce server over the first trusted path further comprises:
  sending seed values to create the fractal pattern;
sending the authentication token from the e-commerce server to a first device;
displaying the authentication token on the first device;
sending a representation of the authentication token to a second device over a second trusted path;

displaying the representation of the authentication token on the second device;

comparing the display of the authentication token on the first device to the display of the representation of the authentication token on the second device; and determining that the e-commerce server is legitimate after matching the display on the first device to the display on the second device.

3. The method of claim 2, wherein the second device is accessible by a user.

4. The method of claim 2, wherein the representation of the authentication token is an image.

5. The method of claim 2, wherein the representation of the authentication token is a text description of the authentication token.

6. The method of claim 2, wherein displaying the authentication token on the first device does not interfere with an e-commerce transaction.

7. The method of claim 6, further comprising:
embedding the authentication token in an unobtrusive corner of a web page displayed on the first device.

8. The method of claim 6, further comprising:
displaying the authentication token as a watermark in web pages displayed on the first device.

9. The method of claim 2, wherein generating the authentication token with the authentication proxy further comprises at least one of:
selecting the authentication token from a storage of shapes; and
generating parameters for the authentication token.

10. The method of claim 9, further comprising:
randomly selecting a particular shape from the storage of shapes.

11. The method of claim 10, further comprising:
assigning a randomly generated color to the selected shape.

12. The method of claim 2, further comprising:
replacing the authentication token with a new authentication token.

13. The method of claim 12, wherein the replacing step occurs periodically during an e-commerce session.

14. The method of claim 12, wherein the replacing step occurs after a user completes a form.

15. The method of claim 12, wherein the replacing step occurs after a user requests a new web page.

16. The method of claim 12, further comprising:
randomly generating the new authentication token.

17. A method of verifying the identity of an e-commerce server comprising:
generating an authentication token with an authentication proxy, wherein the authentication token is a fractal pattern;
sending the authentication token from the authentication proxy to the e-commerce server over a first trusted path, wherein sending the authentication token from the authentication proxy to the e-commerce server over the first trusted path further comprises:
sending seed values to create the fractal pattern;
sending the authentication token from the e-commerce server to a first device;
presenting, the authentication token to a user on the first device;
sending a representation of the authentication token to a second device over a second trusted path;
presenting the representation of the authentication token to the user on the second device;
comparing the presented authentication token on the first device to the presented representation of the authentication token on the second device; and
determining that the e-commerce server is legitimate after matching the first device to the second device.

18. The method of claim 17, wherein the second device is accessible by a user.

19. The method of claim 17, wherein the representation of the authentication token is an image.

20. The method of claim 17, wherein the representation of the authentication token is a text description of the authentication token.

21. The method of claim 17, wherein the representation of the authentication token is an audio description of the authentication token.

22. The method of claim 17, wherein displaying the authentication token on the first device does not interfere with an e-commerce transaction.

23. The method of claim 22, further comprising:
embedding the authentication token in an unobtrusive corner of a web page.

24. The method of claim 22, further comprising:
displaying the authentication token as a watermark in web pages.

25. The method of claim 17, wherein generating the authentication token with the authentication proxy further comprises at least one of:
selecting the authentication token from a storage of shapes; and
generating parameters for the authentication token.

26. The method of claim 25, further comprising:
randomly selecting a particular shape from the storage of shapes.

27. The method of claim 26, further comprising:
assigning a randomly generated color to the selected shape.

28. The method of claim 17, further comprising:
replacing the authentication token with a new authentication token.

29. The method of claim 28, wherein the replacing step occurs periodically during an e-commerce session.

30. The method of claim 28, wherein the replacing step occurs after a user completes a form.

31. The method of claim 28, wherein the replacing step occurs after a user requests a new web page.

32. The method of claim 28, further comprising:
randomly generating the new authentication token.

* * * * *

UNITED STATES PATENT AND TRADEMARK OFFICE
CERTIFICATE OF CORRECTION

PATENT NO. : 8,315,951 B2
APPLICATION NO. : 11/979304
DATED : November 20, 2012
INVENTOR(S) : Zlatko Krstulich et al.

Page 1 of 1

It is certified that error appears in the above-identified patent and that said Letters Patent is hereby corrected as shown below:

In the Claims:

In Column 10, claim 30, Line 50, delete "17" and insert --28--.

Signed and Sealed this
Sixteenth Day of April, 2013

Teresa Stanek Rea
*Acting Director of the United States Patent and Trademark Office*